(12) United States Patent
Herzog et al.

(10) Patent No.: US 7,614,239 B2
(45) Date of Patent: Nov. 10, 2009

(54) TURBINE INSTALLATION HAVING A CONNECTABLE AUXILIARY GROUP

(75) Inventors: Maurus Herzog, Schinznach-Dorf (CH); Michael Hiegemann, Ruefenach (CH)

(73) Assignee: Alstom Technology Ltd, Baden (CH)

( * ) Notice: Subject to any disclaimer, the term of this patent is extended or adjusted under 35 U.S.C. 154(b) by 101 days.

(21) Appl. No.: 11/863,617

(22) Filed: Sep. 28, 2007

(65) Prior Publication Data

US 2008/0048451 A1 Feb. 28, 2008

Related U.S. Application Data

(63) Continuation of application No. PCT/EP2006/061182, filed on Mar. 30, 2006.

(30) Foreign Application Priority Data

Mar. 30, 2005 (CH) .................................. 0547/05

(51) Int. Cl.
*F02C 7/22* (2006.01)
(52) U.S. Cl. .......................................... 60/778; 60/786
(58) Field of Classification Search ................. 60/39.15, 60/779, 774, 778, 39.163, 786, 788, 39.182
See application file for complete search history.

(56) References Cited

U.S. PATENT DOCUMENTS

| 3,237,404 A | 3/1966 | Flanigan et al. |
| 3,306,036 A | 2/1967 | Wooler |
| 3,692,419 A | 9/1972 | Katagiri et al. |
| 3,710,576 A | 1/1973 | Evans et al. |
| 5,315,817 A * | 5/1994 | Vannini et al. ........... 60/39.091 |
| 6,724,099 B2 | 4/2004 | Klaar et al. |
| 2003/0167773 A1 | 9/2003 | Mathias et al. |
| 2004/0159105 A1* | 8/2004 | Tanaka et al. ................. 60/773 |

FOREIGN PATENT DOCUMENTS

| DE | 156618 | 11/1903 |
| DE | 500076 | 6/1930 |
| DE | 10116387 | 10/2002 |
| EP | 1289118 | 3/2003 |
| FR | 995723 | 12/1951 |
| GB | 1272590 | 5/1972 |
| GB | 2247051 | 2/1992 |
| WO | 03076780 | 9/2003 |

OTHER PUBLICATIONS

Michael Valenti, "Making gas turbines safer", Mechanical Engineering, ASME., New York, US, vol. 120, No. 9, Sep. 1998, pp. 62-65, XP000790423, p. 65.

* cited by examiner

*Primary Examiner*—Michael Cuff
*Assistant Examiner*—Andrew Nguyen
(74) *Attorney, Agent, or Firm*—Darby & Darby

(57) ABSTRACT

A turbine installation includes a main group and an auxiliary group, wherein the main group has at least one first turbine and a generator connected for drive purposes to the first turbine. The auxiliary group includes at least one second turbine and is connectable to the main group via a coupling. The turbine installation furthermore includes a first braking device configured to apply a braking torque to the auxiliary group when the auxiliary group is decoupled from the main group.

21 Claims, 10 Drawing Sheets

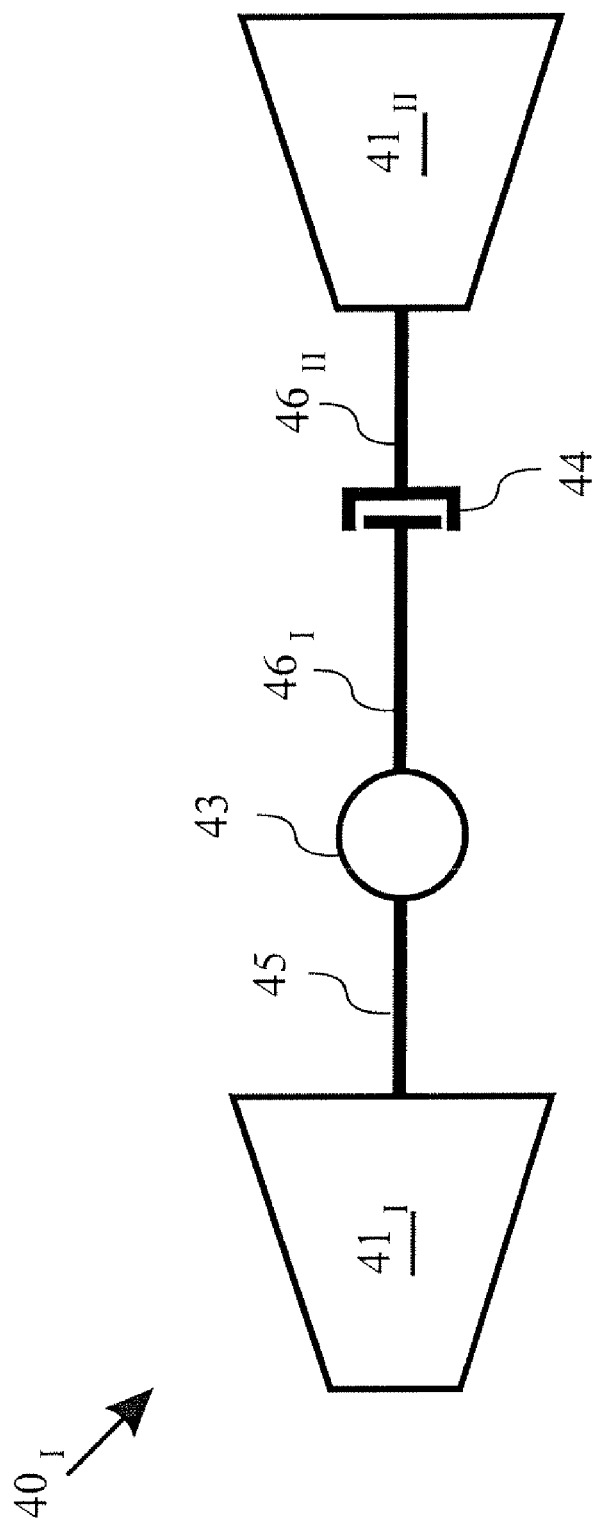

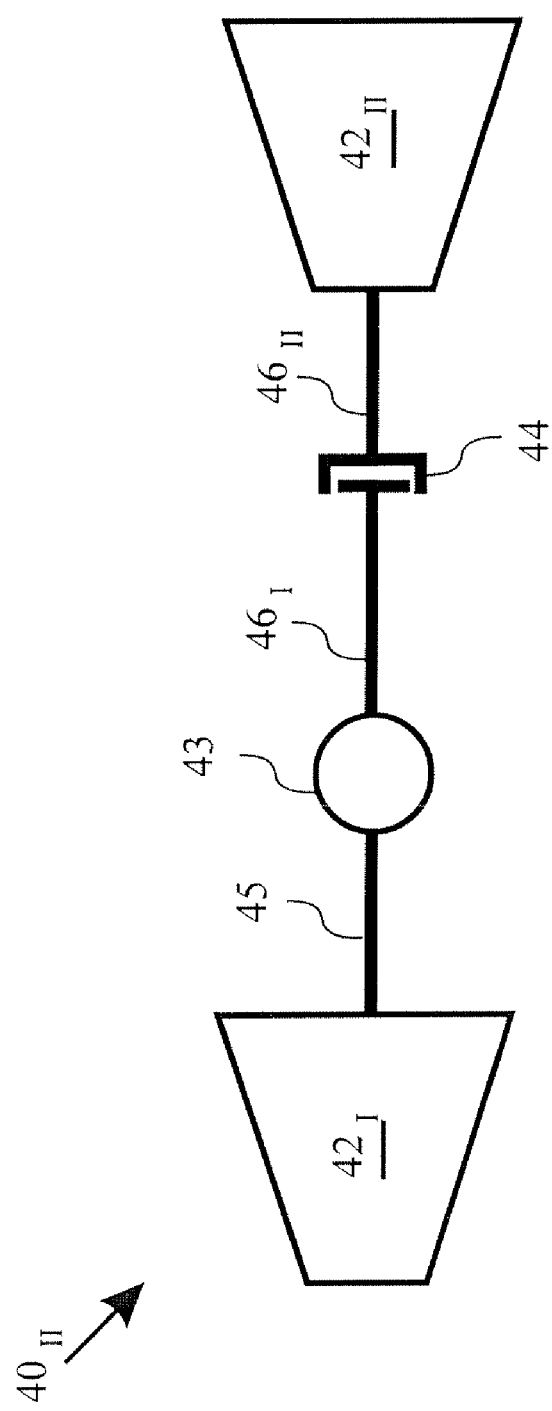

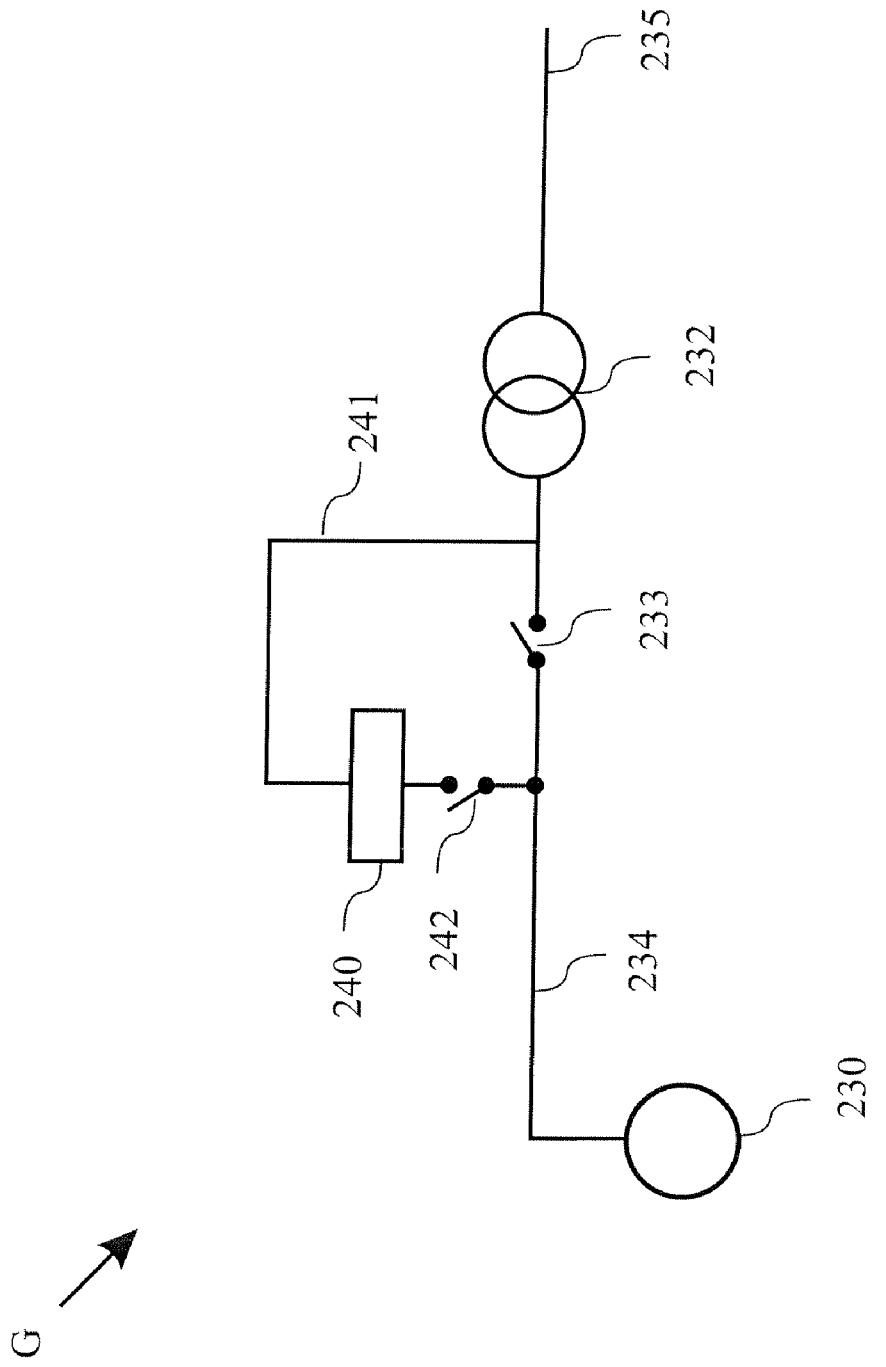

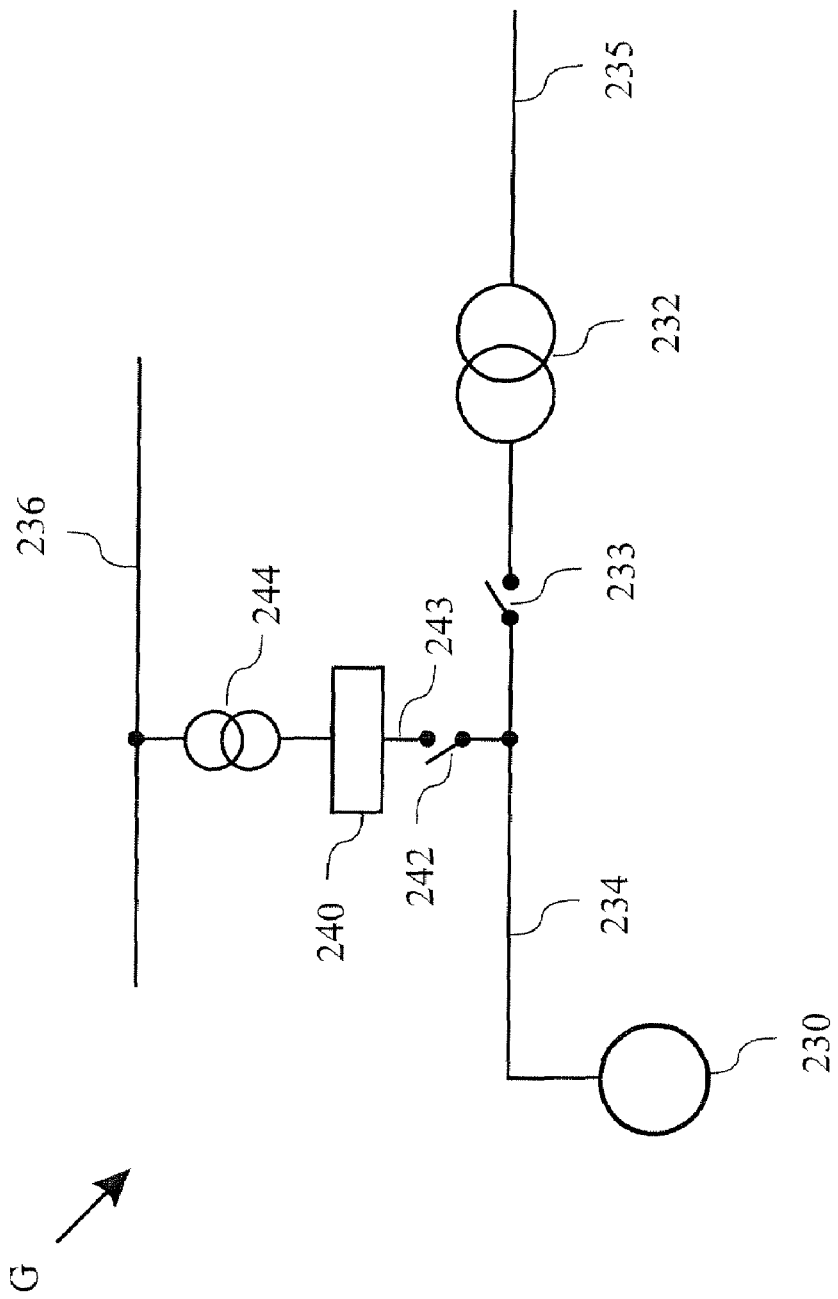

TURBINE INSTALLATION HAVING A CONNECTABLE AUXILIARY GROUP

This application is a continuation of International Patent Application No. PCT/EP2006/061182, filed on Mar. 30, 2006, which claims priority to Swiss Patent Application No. CH 00547/05, filed Mar. 30, 2005. The entire disclosure of both documents is incorporated by reference herein. The International Patent Application designated the United States and was published in German as WO2006/103270 on Oct. 5, 2006.

The present invention relates to a method for starting a turbine installation with a connectable auxiliary group.

BACKGROUND

Modern turbine installations which are used for electricity generation in groups of power stations should be capable of being started in as short a time as possible from being stationary to the rated rotation speed in order in this way to ensure that the installation has high operational reliability. Turbine installations in particular which are used to cover a peak load are especially subject to this requirement. In order to cover peak loads in this way, compressed-air energy storage installation ("compressed-air energy storage" systems or CAES systems for short) are also being increasingly used nowadays in addition to conventional steam-turbine installations or combined gas and steam-turbine installations.

While the turbine installation is being started, and before synchronization, the generators which are used to generate electricity are normally decoupled from the external power supply system into which the electricity that is generated is emitted after synchronization. In this operating state, the generators still do not produce an adequate braking load. In general, the only braking torque acting on the turbine is the windage losses of the turbine and the bearing friction losses of the turbine, and of the generator, which are generally very low in modern installations. In consequence, the turbine is accelerated to high rotation speeds even when the fuel flow rates are low, at which windage effects occur in the rear turbine stages, because the air mass flow rate is not yet sufficiently high. The windage caused by the low air mass flow leads to abnormal mechanical and thermal loads, in particular on the turbine blades. In addition, as is described in international patent application WO 03 076 780, the low air mass flow can lead to an astatic turbine behavior.

In addition, the braking load is generally inadequate as well when these installations are being shut down, immediately after the generator has been decoupled from the external power supply system.

This problem of a lack of braking load during starting and/or shut down occurs both in the case of conventional gas turbine installations, in the case of combination power station installations, in the case of CAES installations and in the case of further turbine groups which are used for electricity generation and in which the generator that is connected to the turbine is decoupled during the starting process and/or during the shut down process from the power supply system into which the electricity that is generated is fed. This also applies to turbine elements which can be shut down and must be started or shut down independently of the main turbine, as required. In the case of steam turbines, the steam generator requirement, in particular, must also be taken into account during the starting process. In the case of air turbines, the turbine may be preceded by one or more recuperators or combustion chambers, which then lead to further restrictions during operation.

In a corresponding manner, it is often necessary to take particular care during acceleration of a turbine installation to ensure that the components which are arranged in the blade-system channel or are adjacent to the blade-system channel are raised to the operating temperature in a controlled manner, matched to one another. This is necessary in order to avoid undesirable thermal expansion and unacceptable thermal stresses in the components as a consequence of the temperature change resulting from the flow in the blade-system channel. It should therefore be possible to pass as great a flow as possible of steam or air through the entire blade-system channel of the respective group, even before synchronization.

By way of example, in this context, DE 101 16 387 A1 proposes that the steam turbine in a steam-turbine installation be preheated before the actual starting process. This allows the starting process to be carried out more quickly. To do this, steam must be taken from the steam generator in some suitable manner before the actual starting process, and must be supplied to the steam turbine. Since, however, from the financial point of view the process of steam generation should as far as possible not be started until the steam turbine installation is being started, the potential of this method for speeding up the starting process of a steam-turbine installation is limited.

In DD 156618, external steam is used to preheat the turbine set of a power station block with steam generator while starting the steam generator. Even if the amount of external steam required is still relatively small owing to the low braking torque of the turbine set in the unsynchronized state, this external steam must be provided from an external means, for example a further steam generator or a supply line from another process. This is generally highly costly.

As an alternative, WO 03 076 780 proposes that a static frequency converter (SFC) be connected via a shaft to the generator in order to use the frequency converter to produce a braking load, and to apply this to the shaft.

Furthermore, EP 1 289 118 A1 proposes that a rectifier exciter machine be operated as an asynchronous generator for acceleration of a turbine set, by means of which a braking torque can then be produced.

From the control engineering point of view, it is particularly complex and highly time-consuming to start and/or to shut down a turbine installation which is equipped with a main group and a connectable auxiliary group, which may also be a group element. This is the case, by way of example, in steam turbines in single-shaft combination installations with a gas turbine and a steam turbine on one shaft group and in special heating and/or extraction turbines with turbine elements which can be disconnected, or else, possibly, in single-shaft air-turbine installations. For starting and/or shut down of the turbine installation, the connectable auxiliary group is normally decoupled from the main group by means of an intermediate coupling. The auxiliary group therefore has to be started and/or shut down separately from the main group. Owing to the lack of an adequate braking torque, this is particularly difficult. In addition, during the process of starting the auxiliary group while it is decoupled from the main group, only a relatively small mass flow of the working fluid, generally air or steam, can be passed through the turbine of the auxiliary group, since it would otherwise be possible to exceed the maximum permissible rotation speed limits. This often leads to inadequate temperature matching between the working fluid and the components of the turbine adjacent to the flow channel through the turbine, so that the time to reach full load is delayed because a higher mass flow cannot be permitted until the coupled state is reached. This higher mass flow is required to warm the components of the turbine up completely, which is itself a precondition for achieving full load.

DE 500 076 proposes, just with regard to the process of shutting down a power source which is connected in series downstream from a first power source, with the power sources operating on different shafts, for the power means coming from the upstream power source still to flow through the downstream power source, and for the drive shaft to be fixed by means of a brake of any desired type. This allows the downstream power source to be shut down without having to shut down the entire installation or having to send the power medium flow via a bypass line, bypassing the downstream power source. The avoidance of the bypass line that this makes possible, or the reduction in the size of the bypass line that this makes possible, leads to a considerable reduction in the hardware complexity.

SUMMARY OF THE INVENTION

An object of the present invention is to provide a method for starting a turbine installation with a connectable auxiliary group that reduces or avoids one or more disadvantages of the prior art. In particular, the method of the present invention is intended to contribute to the capability to start and/or shut down, in a short time, a turbine installation which is used for electricity generation and has a connectable auxiliary group, with an additional aim of largely avoiding the formation of windage in the auxiliary group. An aim of a further aspect of the invention is to provide an additional degree of freedom for the design of a turbine installation with a connectable auxiliary group, in particular with regard to transient operating states of the installation, such as starting or shutting down the installation.

The turbine installation has a main group with at least one first turbine and a generator, which is connected for drive purposes to the first turbine. The turbine installation also has an auxiliary group, which can be coupled to the main group, preferably via a coupling. The auxiliary group has at least one second turbine. The auxiliary group may, however, also be a group element of the turbine installation which is designed in some other way and can be coupled to the main group. The turbine installation is frequently a single-shaft installation, with the single-shaft installation shaft being subdivided into two shaft elements which can be coupled to one another. The first shaft element is then part of the main group, and the second shaft element is part of the auxiliary group. Furthermore, the turbine installation has a first braking device, by means of which a braking torque can be applied to the auxiliary group when the auxiliary group is decoupled.

In the decoupled state, for example while the turbine installation is being started or shut down, the auxiliary group is not coupled to the main group. In particular, no braking torque can be applied via the main group to the auxiliary group when they are decoupled. This also makes it possible to carry out the process of starting and/or shutting down the auxiliary group independently, and therefore separately, from the main group. In order to simplify the control system for starting and/or shutting down the auxiliary group, and therefore to shorten the time period required for starting and/or shutting down the auxiliary group, the first braking device is associated with the auxiliary group. The first braking device accordingly acts directly on the auxiliary group.

Since, according to the invention, a braking torque can therefore be applied in a highly controllable manner to the auxiliary group by means of the first braking device, independently of the main group, the auxiliary group in the turbine installation according to the invention can be started and/or shut down within a considerably shorter time period, independently of the main group. This results in more turbine installation flexibility for control of the starting process and/or the process for shutting down as well as, in particular, also shortening the time period which is required for starting and/or shutting down the entire turbine installation. By way of example, this allows the main group of the turbine installation to be started first of all, in a known manner. The auxiliary group can then be started separately, when required, at a later time. The auxiliary group is coupled to the main group as soon as the two groups have been accelerated to the same rotation speeds. However, as before, the auxiliary group can also be started at the same time, and/or can also be started together with the main group.

The turbine installation may be a steam-turbine installation, a combined gas and steam-turbine installation, a turbine installation in a CAES installation, or else a turbine installation with some other form of turbine set.

For example, two turbines are often connected in series in CAES installations. The first turbine is frequently an air turbine, and the second turbine a gas turbine, which can be connected to the air turbine via a coupling. The air turbine is normally connected to a generator such that they rotate together, so that the air turbine is braked by the generator during starting. In order to allow a braking load to be applied to the gas turbine during the starting process independently and separately from the air turbine, as well, the gas turbine according to the invention has an associated first braking device. The turbines can therefore be accelerated individually and independently of one another, thus making it possible to considerably shorten the total time period required to start the CAES installation. In addition, this makes it possible to take account of the fluid and material temperatures in the turbines during the starting process individually for each turbine in the starting control system. This makes it possible to largely preclude the risk of uncontrolled temperature-dependent material stresses and strains. Further influencing factors which allow the process of starting up and/or shutting down one of the turbines or both turbines to be speeded up can also be taken into account individually so that this also makes it possible to start up and/or to shut down the entire installation on a time-optimized basis.

This results in the same advantages when the first turbine is a gas turbine and the second turbine is a steam turbine which can be connected to the main group. An arrangement such as this is also frequently used in combination power stations. As already mentioned above, the invention can also advantageously be used for steam-turbine installations with connectable turbine elements, in particular for low-pressure turbines in steam-turbine installations with high steam consumptions.

According to one expedient development of the invention, the first braking device is designed such that it can be operatively connected to the auxiliary group and, particularly expediently, can also be decoupled from it again. The operative connection can be produced during operation of the installation, and expediently can also be disconnected or decoupled again during operation. The first braking device need not be permanently mechanically connected to the auxiliary group, although it is possible to design the braking device such that it is connected as required and, for example, is disconnected from the auxiliary group again once the auxiliary group has been accelerated.

In this case, the expression operative connection means that a significant braking torque is transmitted to the relevant turbine by means of the operative connection during operation of the braking device. A purely mechanical connection between the braking device and the turbine therefore does not represent an operative connection, but in most cases will only form the necessary precondition for an operative connection. In addition to the mechanical connection, it is then also necessary for an operative connection to transmit a significant braking torque to the turbine during operation of the braking device.

In this case, significant means that the braking torque must be of approximately the same order of magnitude as the braking torque required to brake the turbine. This does not include braking torques which are caused, for example, solely by bearing friction.

Using the example of electrical brakes, which do not operate when they are not live, this means that, even when the electrical brake is not live, a mechanical connection exists between the electrical brake and the turbine, but not an operative connection. An operative connection occurs only when the electrical brake is live. Electrical brakes are therefore also included in the invention since they can be operatively connected during operation of the installation—and can likewise also be operatively disconnected again—although they are also permanently mechanically connected to the turbine via a shaft.

In order to allow high torques to be transmitted, the first braking device is expediently operatively connected to the shaft of the auxiliary group such that they rotate together. For this purpose, by way of example, a switchable mechanical coupling can be provided between the first braking device and the shaft of the auxiliary group and can be used to produce a mechanical connection between the first braking device and the shaft of the auxiliary group, such that they rotate together.

According to a further advantageous refinement of the invention, the first braking device can be operatively connected selectively to the auxiliary group or to the main group during operation of the braking device. By way of example, this can be achieved by the first braking device having an input shaft which can be selectively connected either to the auxiliary group or to the main group by means of two mutually separate couplings. The first braking device may, however, also have two input shafts, of which the first input shaft can be connected to the main group via a first coupling, and the second input shaft can be coupled to the auxiliary group of the turbine installation via a second coupling. In this case, in addition, a logic means, preferably a controller, is used to ensure that the first braking device is only ever coupled to one group at one time during operation of the first braking device.

The advantage of a first braking device designed in this way is that only one braking device is required in order to allow both the main group and the auxiliary group to be started up or to be shut down, controlled by the braking torque. In this case, the two groups can be started up and/or shut down successively. The turbine installation is normally started by starting the main group first of all, followed by the auxiliary group. The opposite procedure is expediently used to shut down the turbine installation.

Braking loads can therefore be applied to the at least two turbines, that is to say the turbine in the main group and the turbine in the auxiliary group, using only one braking device. However, in this case, the braking loads are applied successively.

In a further advantageous refinement of the invention, the first braking device can be operatively connected at the same time both to the auxiliary group and to the main group of the turbine installation. This can be achieved, for example, by the first braking device having two input shafts, of which the first input shaft can be coupled via a first coupling to the main group, and the second input shaft can be coupled via a second coupling to the auxiliary group of the turbine installation. Braking loads can therefore be applied at the same time to the at least two turbines, that is to say the turbine in the main group and the turbine in the auxiliary group, using only one braking device.

In this refinement of the invention, a means for varying the split of the braking load of the first braking device between the auxiliary group and/or the main group is advantageously additionally arranged between the first braking device and the auxiliary group and/or between the first braking device and the main group. The means for varying the split of the braking load may, for example, be a hydrodynamic or hydrostatic converter. One hydrodynamic or hydrostatic converter is expediently associated with each group. In the case of a turbine installation which has been developed according to the invention in this way, the main group and the auxiliary group can be started and/or shut down at the same time, and an individual braking torque can be applied to each group by means of the first braking device in this way. The magnitude of the individual braking torque applied to the respective group can be varied and adapted via the total braking torque produced by the first braking device and the split of the total braking torque between the individual braking torques, with the aid of the means for varying the split of the braking load.

However, it may also be advantageous for the first braking device to be mechanically connected to the shaft of the auxiliary group. This avoids the need to arrange a coupling between the auxiliary group and the first braking device. However, the first braking device can then not be disconnected from the auxiliary group in the accelerated state, but continues to run with it. The operative connection can, however, be disconnected according to the invention, in the accelerated state.

According to one advantageous refinement of the invention, the first braking device comprises a fluid brake which operates on the basis of swirling a braking fluid. Fluid brakes are largely wear-free, and can also be used to produce high braking torques. However, suitable heat dissipation for the dissipated braking power must be ensured, for example via one or more oil coolers, which are already present in the turbine installation. The braking effect can be varied either by means of the amount of fluid located in the fluid brake with a constant accommodation volume, or by varying the accommodation volume of the fluid brake for a constant amount of fluid.

According to a further advantageous refinement of the invention, the first braking device comprises an electrical brake. Electrical brakes produce an eddy current which can be externally influenced by means of an auxiliary device and generally acts on a disk arranged on the shaft. However, a small electrical generator can also be used as an electrical brake, whose power is converted, for example by means of resistors, to heat or is passed on for some productive purpose by means of one or more frequency converters. Electrical brakes are largely wear-free and can also be used to produce high braking torques. Suitable heat dissipation needs to be ensured in this case as well. Electrical brakes have the disadvantage of high investment costs.

According to a further advantageous refinement of the invention, the first braking device comprises a mechanical brake. However, because of the wear, mechanical brakes are suitable only for relatively small and medium-size installations, and are suitable only to a restricted extent for very large installations.

Furthermore, the turbine installation may expediently also comprise a second braking device, which can also be operatively connected to the main group when the auxiliary group is decoupled, in order in this way to allow a braking torque to be applied to the main group. The arrangement of a second braking device is particularly advantageous when the first braking device arranged according to the invention cannot be connected to the main group as well, or when the braking torques which can be produced by means of the first braking device are not sufficient for the main group.

The second braking device can be connected to the shaft of the main group such that they rotate together, or else can be connected such that they rotate together or with slip. The first braking device is therefore associated with the auxiliary group, and the second braking device with the main group.

The turbine installation according to the invention can be retrofitted to many already installed turbine installations. Often, all that is necessary for this purpose is to add to the already existing generator installation of the turbine installation.

In many applications, it will be expedient to equip a turbine installation with a controllable bypass in addition to a generator installation according to the invention, in order to allow a proportion of a working fluid to bypass a turbine or turbine element in the main group or the auxiliary group. A combination of the arrangement according to the invention of a first braking device with a controllable bypass provides two control variables, as degrees of freedom of the control system, for controlling the starting process of the auxiliary group of the turbine installation. However, with a combined arrangement of a first braking device and a bypass, the bypass can be designed to be smaller, thus involving less financial investment, than would be the case without a first braking device. Furthermore, a combination of a bypass and a braking device makes it possible to shorten the starting time.

As already mentioned, the first and/or the second braking device are/is expediently an electrical brake. The electrical brake advantageously comprises generator circuitry for connection of a generator which is connected for drive purposes to the turbine or the turbine element of the respective group. The generator is expediently a synchronous generator, with the invention also having braking devices in which the generator is an asynchronous generator. Synchronous rotation speeds can be set both using synchronous generators and using asynchronous generators. However, these synchronous rotation speeds can be controlled more easily in the case of a synchronous generator, thus resulting in less stringent control requirements when using a synchronous generator than when using an asynchronous generator.

In a known manner, the generator has a stator and a rotor. The generator circuitry comprises a field circuit, via which the stator and the rotor are connected to one another. For external excitation of the rotor, electrical power is tapped off from the stator and is supplied to the rotor via the field circuit. In addition, at least one further electrical load can be provided, and can be connected to the field circuit in order to increase the braking load of the generator.

An increased electrical power is tapped off from the generator stator as a consequence of the connection of the further electrical load, with the difference between the increased electrical power and the original electrical power being consumed by the further electrical load. When the electrical power that is tapped off is higher, the generator produces a greater braking torque, which then acts on the turbine, which is connected to the generator for drive purposes.

In one advantageous development of the generator circuitry in the turbine installation, the at least one further electrical load is arranged connected in parallel with the field circuit, and is therefore connected in parallel with the field circuit. The field circuit expediently has a field transformer with a primary and a secondary, as well as a rectifier with an anode side and a cathode side. The primary of the field transformer is then connected to the generator stator, and its secondary is connected to the anode of the rectifier. The cathode of the rectifier is connected to the generator rotor. The field circuit therefore represents a closed circuit, together with the generator stator and the generator rotor.

The electrical load can then, for example, be arranged such that it can be connected in the field circuit in the region between the generator stator and the primary of the field transformer. Alternatively, the electrical load may, however, also be arranged such that it is connected in the region between the secondary of the field transformer and the anode of the rectifier, or in the region between the cathode of the rectifier and the generator rotor. In one advantageous development of the generator circuitry, the at least one further electrical load is a load resistance.

A switching element, by means of which the at least one further electrical load can be connected to the field circuit, is expediently arranged between the at least one further electrical load and the field circuit. The switching element may be a mechanical switch or else, alternatively, a semiconductor arrangement.

In order to additionally allow the braking power to be increased in steps, it is also expediently possible to provide a plurality of further electrical loads which can then be connected to the field circuit separately from one another. When a plurality of electrical loads are provided, these can be arranged such that the electrical loads can all be connected to one region of the field circuit, for example the region between the secondary of the field transformer and the anode of the rectifier, or else to different regions of the field circuit. A plurality of electrical loads which are arranged such that they can be connected may, of course, also all be connected to the field circuit at the same time during operation of the turbine installation.

In a further expedient development of the turbine installation, the first braking device and/or the second braking device comprises a generator installation having a generator, which is connected for drive purposes to a turbine in order to generate electricity, a transformer, whose primary is connected to the generator and whose secondary is connected to an external power supply system and/or to an internal power supply system, and a means for frequency matching, which is arranged between the generator and the transformer.

If the means for frequency matching is arranged between the generator and the transformer, this makes it possible to emit electrical power into the connected power supply system irrespective of the operating state of the turbine installation— that is to say even while the turbine installation is being started and/or shut down. As a result of the electrical power that is generated being emitted into the power supply system while the turbine installation is being started and/or shut down, the generator produces a considerably better braking torque than would be the case if the generator were disconnected from the transformer. A greater braking torque leads to the capability to apply the increase in the load to the turbine installation during starting more uniformly. An increased flow rate of working fluid that is now permissible at the same time reduces the occurrence of windage in rear turbine stages or downstream turbines.

A frequency converter, in particular a static frequency converter, is expediently used as the means for frequency matching in this case. Furthermore, the means for frequency matching can advantageously be connected in one preferred refinement of the invention.

In one preferred embodiment of the invention, the generator and the transformer are connected to one another via a connection line. The means for frequency matching is then expediently arranged such that it can be connected in the connection line. For this purpose, by way of example, a first disconnection element is expediently arranged in the connection line. The means for frequency matching can then advantageously be arranged in a bypass line, which bypasses the first disconnection element, with a second disconnection element also being arranged in the bypass line. The means for frequency matching can thus be connected in a simple manner, or else can be disconnected again with the reverse switching logic by opening the first disconnection element, which is arranged in the connection line, while simultaneously closing the second disconnection element, which is arranged in the bypass line. The disconnection elements are expediently isolating switches.

BRIEF DESCRIPTION OF THE DRAWINGS

The invention will be explained in more detail in the following text with reference to a plurality of exemplary embodiments, which are illustrated, in each case schematically, in the figures, in which:

FIG. 1b shows a steam power station installation as known from the prior art;

FIG. 1c shows a combined gas and steam power station installation as known from the prior art;

FIG. 7a shows a generator installation with a feed to an external power supply system for use in a turbine installation according to the invention; and FIG. 7b shows a generator installation with a feed to an internal power supply system for use in a turbine installation according to the invention.

The figures show only those elements and components which are essential for understanding of the invention. The illustrated exemplary embodiments should be regarded as being purely instructional and are intended to be used for better understanding, but should not be understood as any restriction to the subject matter of the invention.

DETAILED DESCRIPTION

Figure 1A:
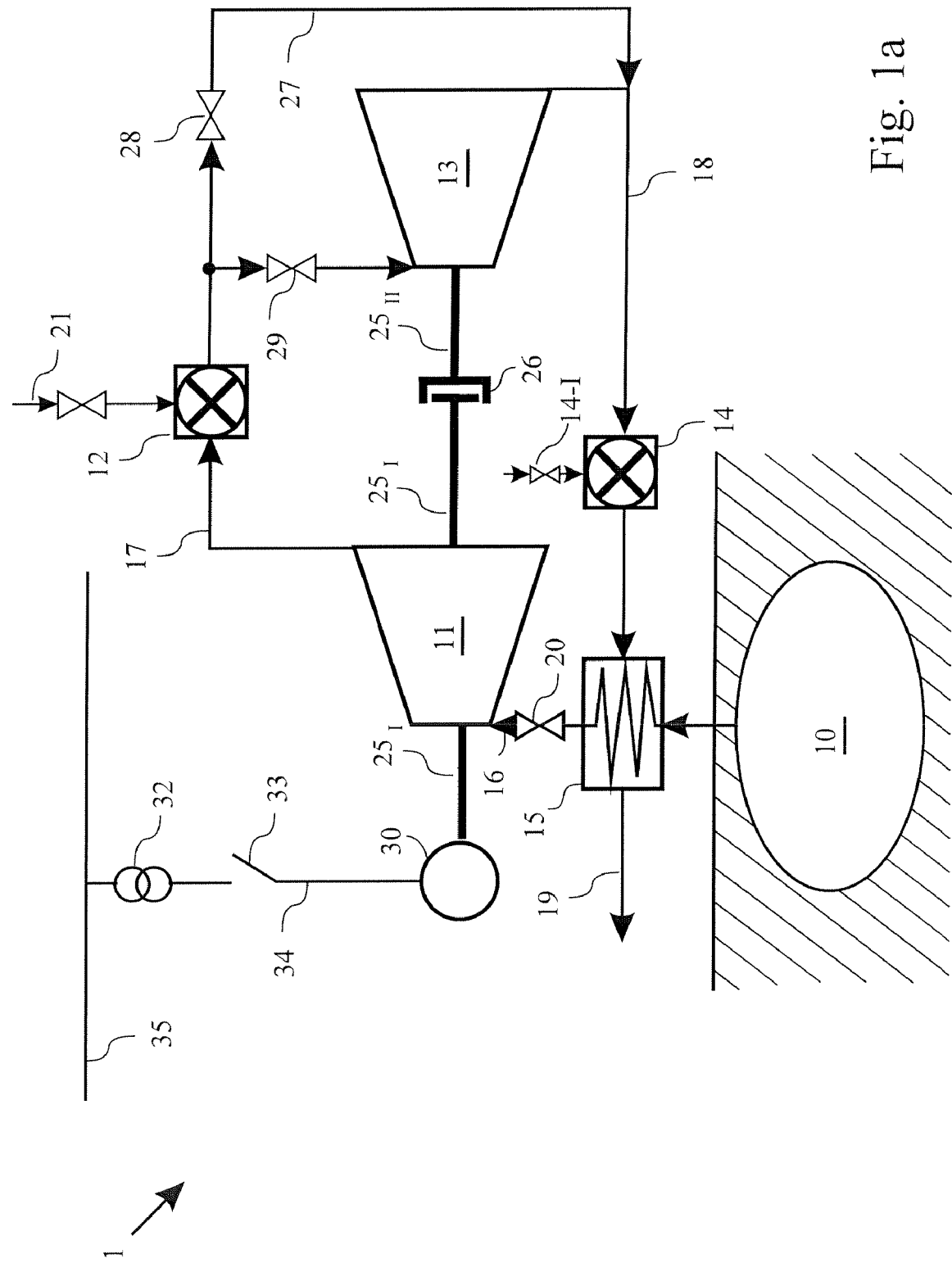
FIG. 1a shows a CAES installation as known from the prior art.

FIG. 1a shows a schematic illustration of a CAES installation 1 according to the prior art. The CAES installation 1 has a gas reservoir 10 in which a gas, for example air, can be stored under pressure. Furthermore, the CAES installation 1 has a turbine set which, in the embodiment illustrated in FIG. 1a, comprises a first air turbine 11 and a low-pressure turbine 13 connected downstream from the air turbine. The gas reservoir 10, the air turbine 11 and the low-pressure turbine 13 are connected to one another via connection lines 16 and 17. A shut-off valve 20 in order to restrict or shut off the flow from the gas reservoir 10 is arranged in the connection line 16. The low-pressure turbine 13 is then followed by further lines 18 and 19.

Furthermore, a heat exchanger 15 is connected in the line 16 upstream of the air turbine 11. The fuel-gas/air mixture emerging from the low-pressure turbine 13 is used in the heat exchanger 15 to preheat the air coming from the gas reservoir 10. A combustion chamber 12 is also arranged between the air turbine 11 and the low-pressure turbine 13, in order to heat the air emerging from the air turbine 11, before the fuel-gas/air mixture which has been heated and expanded in this way enters the low-pressure turbine 13. The combustion chamber 12 is for this purpose supplied with fuel, for example a fuel gas, via the fuel supply line 21. A further auxiliary burner 14 with its own fuel supply line 14-I is arranged downstream from the low-pressure turbine 13, in order to further increase the temperature of the fuel-gas/air mixture before it enters the heat exchanger 15. Once heat has been emitted to the cold air, coming from the gas reservoir 10, in the heat exchanger 15, the fuel-gas/air mixture finally leaves the CAES system 1 through the output line 19, and is emitted from there, for example, to the surrounding area.

The air turbine 11 and the low-pressure turbine 13 are connected to a generator 30 via a common shaft, with the shaft in this case being subdivided into two shaft elements $25_I$ and $25_{II}$, which can be connected to one another via a coupling 26. The turbine 11, the shaft element $25_I$ and the generator 30 in this case form the main group of the turbine installation; the turbine 11 and the shaft element $25_{II}$ form the auxiliary group of the turbine installation.

Furthermore, the generator 30, which generates electricity, is connected via an electrical power line 34, in which an interruption switch 33 is connected, to a primary of a power supply system transformer 32. The secondary of the power supply system transformer 32 is connected to an external power supply system 35.

While the turbine installation is being started, the shaft elements $25_I$ and $25_{II}$ are decoupled from one another, so that each group can be started independently of the respective other group. The groups are coupled to one another via the coupling 26 only when each of the turbines has reached its rated rotation speed.

Essentially, only the comparatively low friction losses of the bearings for the turbines, for the shafts and for the connected generator act as a braking torque during starting. While the turbine 11 is being decelerated at least by the braking torque produced by the generator, the turbine 13 is already being accelerated to high rotation speeds with a comparatively low air mass flow rate. The high rotation speeds together with an air mass flow rate which, however, is only low often result in the formation of flow windage, particularly in the rear turbine stages of the turbine 13. The flow windage in turn causes high, but at least atypical, thermal and mechanical loads on the blades.

In order to achieve rapid temperature equalization, it is also desirable to ensure that as high an air mass flow rate as possible can flow through the two turbines 11 and 13 even at an early stage during the starting process.

The problem described above also occurs during the starting process in the power-station installations illustrated schematically in FIGS. 1b and 1c and known from the prior art.

FIG. 1b shows a steam power-station installation $40_I$, which comprises a first steam turbine $41_I$, a second steam turbine $41_{II}$ and a generator 43. The first steam turbine $41_I$ is permanently connected to the generator 43 via the shaft 45 such that they rotate together. The second steam turbine $41_{II}$ is connected to the generator, such that it can be disconnected, via the shaft elements $46_I$ and $46_f$, which can be connected to one another by means of the coupling 44. In order to start the steam power-station installation, the second steam turbine $41_{II}$ is decoupled from the generator 43 by means of the coupling 44. This accordingly results in virtually no braking load being applied to the second steam turbine. The second steam turbine would accelerate to an unacceptably high rotation speed, even with a low steam mass flow.

This applies in the same way to the steam turbine $42_{II}$ in the combination power-station installation $40_{II}$ illustrated in FIG. 1c. In addition to the steam turbine $42_{II}$, the combination power-station installation $40_{II}$ has a gas turbine $42_I$.

This is the purpose of the invention. FIGS. 2 to 5 show, in each case illustrated schematically, turbine installations according to the invention. The figures in each case show only the situation which is essential for understanding of the invention. For example, the figures do not show the inlet flow and outlet flow line to and from the turbines, the shut-off and control elements for controlling the flow, or any combustion chambers or intermediate heaters which may be provided.

Figure 2:
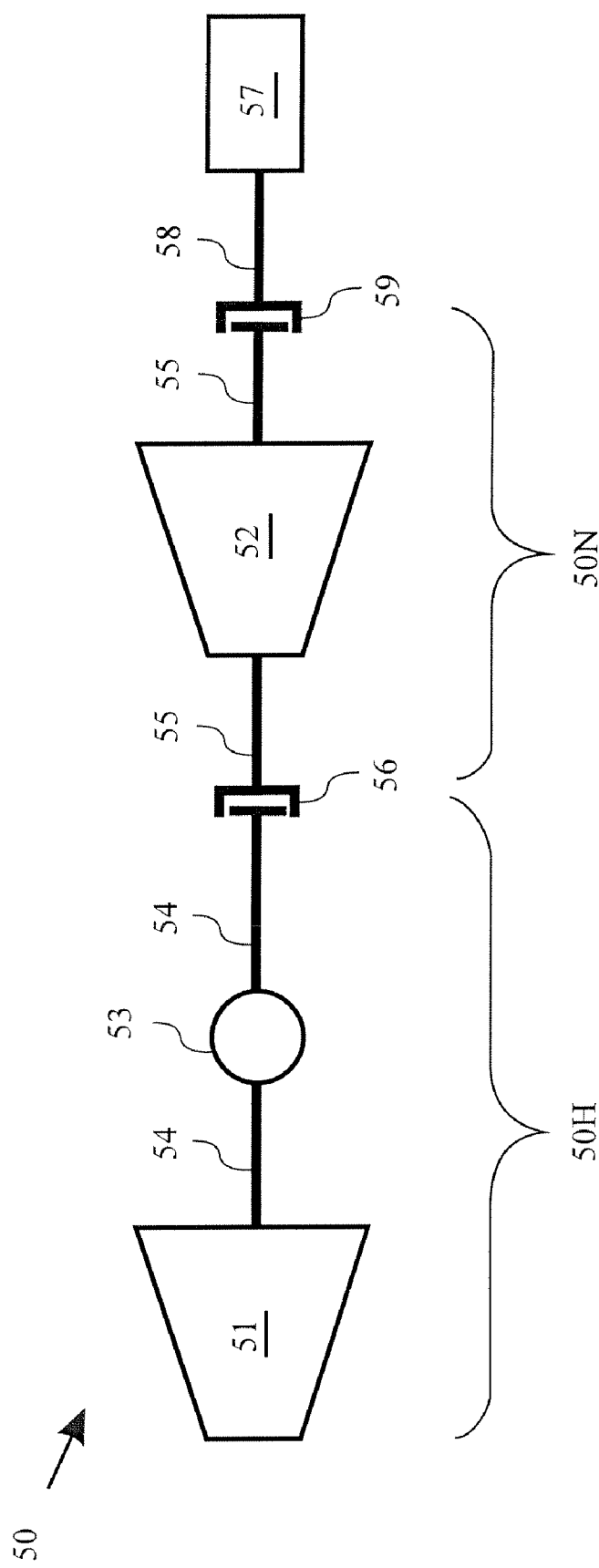
FIG. 2 shows a first turbine installation according to the invention.

FIG. 2 shows a turbine installation 50 according to the invention with a first braking device 57 associated with the auxiliary group 50N. A braking torque can be applied in a controlled manner to the auxiliary group 50N of the turbine installation 50 by means of the first braking device 57 even when the auxiliary group 50N is decoupled from the main group 50H.

The turbine installation 50 has a first turbine 51 and a second turbine 52, in which case, for example, the first turbine 51 may be a gas turbine and the second turbine 52 may be a steam turbine. However, both turbines may also be steam turbines or else gas or air turbines. The turbine 51 is permanently connected to the shaft element 54, and the turbine 52 to the shaft element 55. The shaft elements 54 and 55 can in turn be coupled to one another via the coupling 56 arranged between the shaft elements. A generator 53 is permanently connected to the shaft element 54 and is driven in order to generate electricity by the turbine 51 and, when the shaft elements 54 and 55 are coupled to one another, by the turbine 52 as well. Together with the generator 53 and the shaft element 54, the turbine 51 in this case forms the main group 50H of the turbine installation 50. The turbine 52 and the shaft element 55 form the auxiliary group 50N of the turbine installation 50.

In order now to allow a braking torque to be deliberately applied to the auxiliary group 50N, even in the decoupled state and independently of the main group 50H, the first braking device 57 is permanently connected to a further shaft element 58, in which case the further shaft element 58 can be connected via the coupling 59 to the shaft element 55 of the auxiliary group 50N, such that they rotate together or with slip. When the coupling 59 is engaged, a braking load can therefore be transmitted from the first braking device 57 to the turbine 52 via the shaft elements 58 and 55.

The coupling 59 is often also superfluous. This is particularly true in situations in which the braking effect of the first braking device 57 can be switched off virtually completely, as is the case, for example, with an electrical brake. When the electrical brake 57 is not live, only negligibly small bearing losses are produced, so that the electrical brake 57 can remain connected to the auxiliary group 50N of the turbine installation 50 even during normal operation.

The first braking device 57 may be a fluid brake, an electrical brake, a mechanical brake or else a combination of them, with the respective specific advantages.

In order to start the turbine installation 50 illustrated in FIG. 2, the auxiliary group 50N is normally disconnected from the main group 50H by means of the coupling 56, in order to start the main group and auxiliary group separately from one another. The groups 50H and 50N are coupled to one another again via the coupling 56 only once the rated rotation speed has been reached. As has already been stated with regard to FIG. 1a, one problem that arises in this case is that virtually no braking torque, or only a very small braking torque, would act in particular on the turbine 52 with the installation 50 being started in the uncoupled state. The turbine 52 would therefore be accelerated to unacceptably high rotation speeds even with a low mass flow of the working fluid. The provision of the first braking device 57 allows a braking torque which is independent of the main group 50H to be applied to the turbine 52 during starting and/or shutdown. On the one hand, the starting and/or shutdown of the auxiliary group can be controlled well in this way. On the other hand, the braking torque which is produced by the braking device 57 and is applied to the turbine 52 means that a greater mass flow of working fluid can be passed through the turbine 52 even while starting. This allows the temperatures of the components adjacent to the flow channel to be matched more quickly and more uniformly during the starting process to the temperature of the working fluid, thus making it possible to reduce, or largely avoid, the formation of windage.

Once both the main group 50H and the auxiliary group 50N have been accelerated to the rated rotation speed, the groups are coupled to one another via the coupling 56. The first braking device 57 is then decoupled from the auxiliary group 50N via the coupling 59. The first braking device 57 is therefore not driven any further once the turbine installation 50 is in the accelerated state. In order to shut down the turbine installation 50, the first braking device 57 can be coupled to the auxiliary group 50N again, before decoupling the auxiliary group 50N from the main group 50H.

In addition to mechanical coupling and decoupling of the first braking device to and from the auxiliary group, it is also possible, for example, in the case of a braking device which has a generator and a frequency converter to just electrically connect the frequency converter to the generator or auxiliary generator, which is otherwise running on No load, or to electrically disconnect it therefrom. A braking device in the form of a hydrodynamic converter can also just be filled with oil or the oil can be removed again in order in this way to ensure optimum normal operation. The frequency converter and hydrodynamic converter can therefore remain permanently mechanically connected to the auxiliary group, even when no operative connection is intended to be produced.

Figure 3:
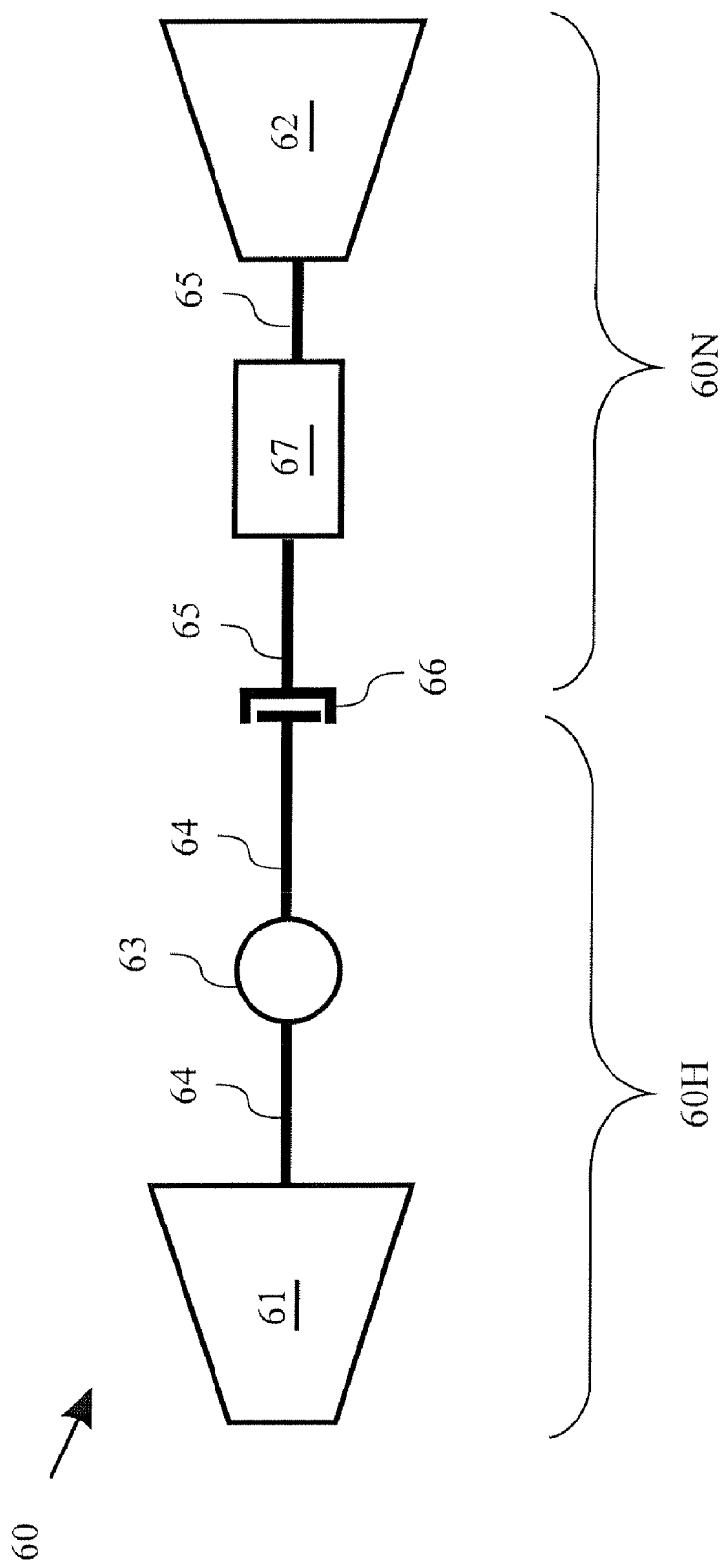
FIG. 3 shows a second turbine installation according to the invention.

FIG. 3 shows a second turbine installation 60 according to the invention. The turbine installation 60 has a first turbine 61 and a second turbine 62. By way of example, the first turbine may be a gas turbine, and the second turbine a steam turbine. However, it is also possible for both turbines to be steam turbines, or else gas or air turbines. The turbine 61 is permanently connected to the shaft element 64, and the turbine 62 to the shaft element 65. The shaft elements 64 and 65 can be coupled to one another via the coupling 66 arranged between the shaft elements. A generator 63 is permanently connected to the shaft element 64 and is driven by the turbine 61, and by the turbine 62 as well when the shaft elements 64 and 65 are coupled to one another, in order to generate electricity. Together with the generator 63 and the shaft element 64, the turbine 61 in this case forms the main group 60H of the turbine installation 60. The turbine 62 and the shaft element 65 form the auxiliary group 60N of the turbine installation 60.

Furthermore, in this case, a first braking device in the form of a synchronous or asynchronous generator 67 is connected to the shaft element 65 such that they rotate together. However, there is no operative connection between the generator 67, which is in the form of the first braking device, and the turbine 62 until current passes through the generator 67, since the generator 67 does not produce any braking load until current passes through it. When no current is flowing, the generator results in only negligible losses, for example resulting from bearing friction.

The turbine installation 60 is operated analogously to the statements relating to FIG. 2. However, in this case, the generator 67, which is in the form of the first braking device, cannot be decoupled from the shaft element 65 once the turbine installation 60 has been accelerated.

The first braking device 67, which is arranged between the coupling 66 and the turbine 62 in FIG. 3, could, however, also be arranged at the shaft end of the turbine 62 on the turbine outlet side.

Figure 4:
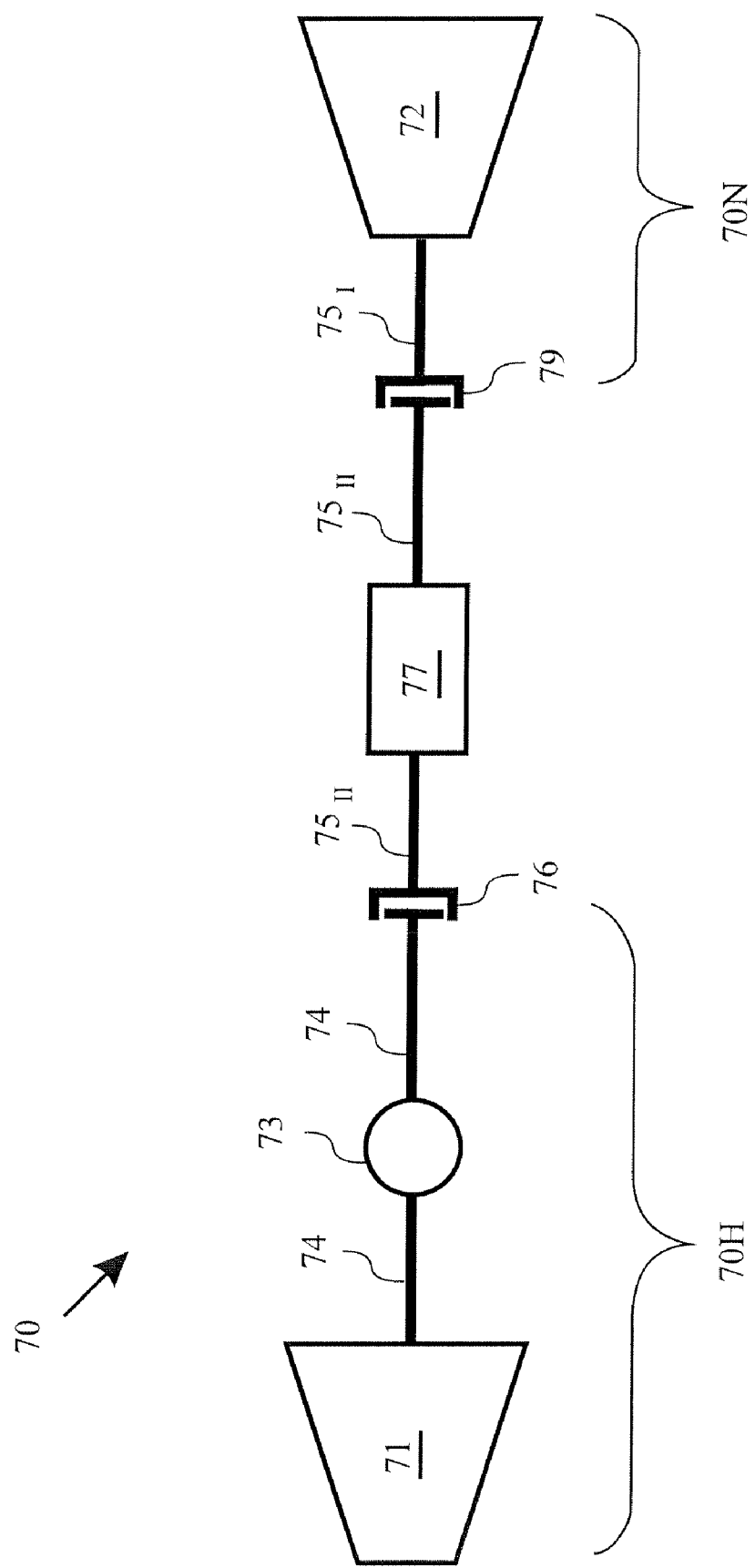
FIG. 4 shows a third turbine installation according to the invention.

FIG. 4 shows a third turbine installation 70 according to the invention. The turbine installation 70 illustrated here once again has a main group 70H and an auxiliary group 70N. The main group 70H has a first turbine 71, and a generator 73. The first turbine 71 and the generator 73 are connected to one another permanently via the shaft 74 such that they rotate together. The auxiliary group 70N has a second turbine 72, which is connected to the shaft element $75_I$ such that they rotate together. The shaft element $75_I$ can be connected to the shaft element $75_{II}$ by means of the coupling 79. The shaft element $75_{II}$ can in turn be connected to the shaft 74 by means of the coupling 76. The second turbine 72 can therefore also be connected to the generator 73 by engaging both couplings 76 and 79.

The first turbine may, for example, be a gas turbine and the second turbine may be a steam turbine. However, both turbines may also be steam turbines, or else gas or air turbines.

A first braking device in the form of the generator 77 is also arranged on the shaft element $75_{II}$. The generator 77 may be a synchronous generator or an asynchronous generator. The braking device can be coupled to the main group 70H by means of the coupling 76, and to the main group 70N by means of the coupling 79.

In order to produce an operative connection between the generator 77 and one of the turbines, or both turbines, current must also be passed through the generator 77, in addition to the relevant coupling being engaged. An operative connection in this case accordingly occurs only during operation of the generator 77, that is to say when current is flowing in the generator 77.

The turbine installation 70 illustrated in FIG. 4 can be started in two ways. On the one hand, the braking device 77 can be selectively operatively connected either to the auxiliary group 70N or to the main group 70H. In this mode, the main group 70H and the auxiliary group 70N can be connected to the braking device 77 only successively during starting and/or shutdown of the installation. The respective other group must for this purpose be decoupled from the braking device 77 via the respective coupling during the starting process. However, alternatively, it may also be expedient to operatively connect the braking device 77 at the same time both to the main group 70H and to the auxiliary group 70N. For this purpose, both couplings 76 and 79 are engaged, and current is passed through the generator 77.

The mode that is used depends on the maximum available braking load from the generator 77 and the braking torques required for the turbines 71 and 72. If the maximum available braking load is not sufficient to adequately brake both turbines during the starting process, the turbine installation 70 must be started using the first mode, that is to say the turbines are started successively. For this purpose, the couplings and the generator 77 are driven by a control apparatus, which is not illustrated in FIG. 4.

The turbine 71 can thus be started first of all, with the turbine 71 having a braking torque applied to it from the generator 77. In this case, the coupling 76 is engaged, and the coupling 79 disengaged. Once the synchronous rotation speed has been reached, the generator emits power to an external power supply system (not illustrated in FIG. 4), or to an internal power supply system for the installation's own requirements (likewise not illustrated in FIG. 4), and therefore exerts a significant braking torque on the shaft 74. The braking load produced by the generator 77 is now no longer required, and the coupling 76 is disengaged. When the coupling 79 is disengaged, the braking load produced by the generator 77 acts exclusively on the turbine 72. Once the turbine 72 has reached the synchronous rotation speed, the coupling 76 is engaged. The braking load produced by the generator 77 is no longer required from then on. The field line is accordingly disconnected, that is to say the current flow to the generator 77 is ended. When no current is flowing, the generator 77 produces only very minor losses, caused essentially just by the bearing for the generator 77. The generator 77 is admittedly still mechanically connected to the shaft element $75_{II}$. However, there is no longer any operative connection between the generator 77 and one of the turbines.

If, in contrast, the intention is to start the turbines 71 and 72 at the same time, then the generator 77 must be operatively connected to both turbines at the same time. For this purpose, both couplings 76 and 79 are engaged, and current is passed through the generator 77. Furthermore, in this situation, at least one means for varying the split in the braking load is expediently arranged between the generator 77 and the turbine 71, and/or between the generator 77 and the turbine 72. In the exemplary embodiment illustrated in FIG. 4, these means are expediently integrated in the couplings 76 and 79. In this case, the couplings are therefore hydrodynamic or hydrostatic couplings in which the power transmission can be varied by means of the oil filling. The split in the braking load may, however, also be achieved by trimming the installation by means of bypasses.

Figure 5:
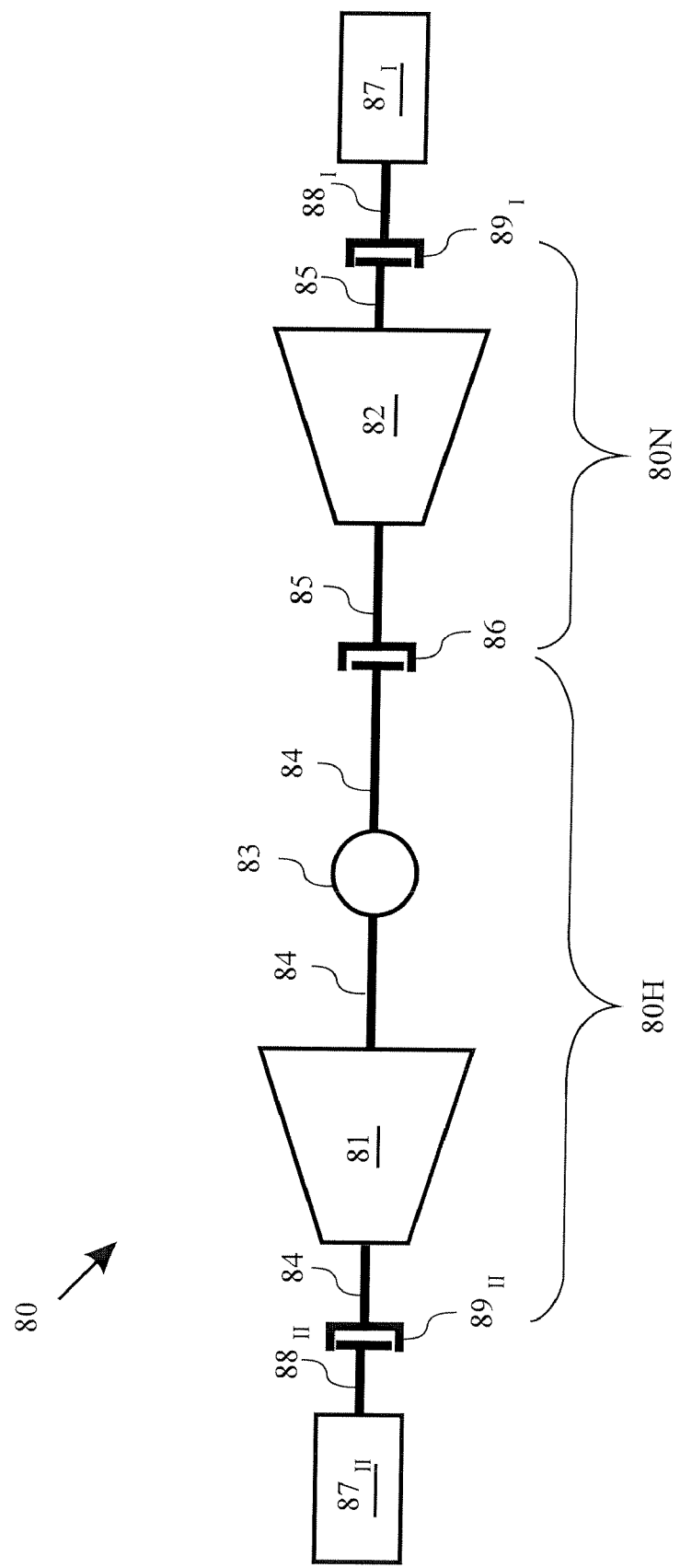
FIG. 5 shows a fourth turbine installation according to the invention.

FIG. 5 shows a further turbine installation 80 according to the invention, which is largely similar to the turbine installation 50 illustrated in FIG. 2. The turbine installation 80 therefore has a first turbine 81 and a second turbine 82. The turbine 81 is connected to the shaft element 84, and the turbine 82 to the shaft element 85. The shaft elements 84 and 85 are coupled to one another via the coupling 86 arranged between the shaft elements. The generator 83 is permanently connected to the shaft element 84.

The turbine 81, the generator 83 and the shaft element 84 together form the main group 80H of the turbine installation 80, the turbine 82 and the shaft element 85 form the auxiliary group 80N. A first braking device 87I is permanently connected to a first further shaft element 88I, in which case the first further shaft element 88I can be connected to the shaft element 85 of the auxiliary group 80N via a first further coupling 89I, such that they rotate together or with slip, as also shown in FIG. 2. Furthermore, in this case, a second braking device 87II is also provided, and is connected permanently to a second further shaft element 88II. The second further shaft element 88II can in turn be connected via a second further coupling 89II to the shaft element 84 of the main group 80H, such that they rotate together or with slip. The first braking device 88I and the second braking device 88II may be fluid brakes, electrical brakes, mechanical brakes or else combinations of them, with the respective specific advantages.

In order to start the turbine installation 80 as illustrated in FIG. 5, a braking load is therefore applied to the main group 80H and to the auxiliary group 80N as well by means of the respectively associated braking device 87I or 87II. The main group and the auxiliary group can thus be started decoupled from one another, and are coupled to one another via the coupling 86 only once the rated rotation speed has been reached in the accelerated state. The first braking device 87I is then decoupled from the auxiliary group 80N via the coupling 89I. In the same way, the second braking device 87II is also decoupled from the main group 80H via the coupling 89II.

Figure 6:
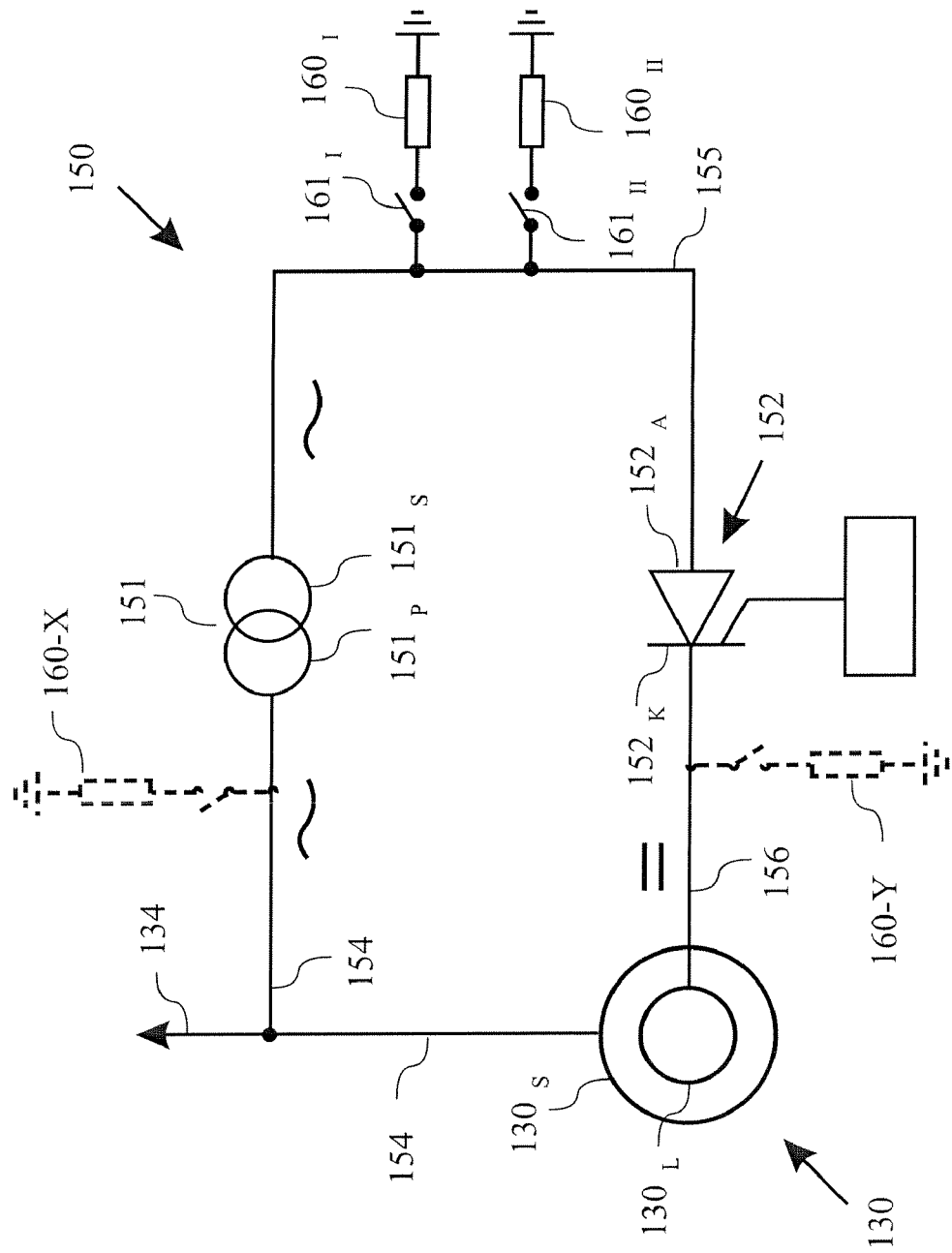
FIG. 6 shows generator circuitry for use in a turbine installation according to the invention.

Furthermore, FIG. 6 shows the generator circuitry for connection of a generator which can be operated as a first braking device and/or as a second braking device, or as a part of such a device. The generator circuitry for the generator 130 include a field circuit 150, which has been upgraded here such that at least one of the two further electrical loads 160I or 160II can be connected to the field circuit 150, depending on the requirement. In the normal manner, the generator 130 has a rotor 130L and a stator 130S. The rotor 130L is in the form of an internal rotor and is arranged concentrically with respect to the stator 130S, and is connected or can be connected to one or more turbines (for example the turbine 52 shown in FIG. 2) via at least one shaft (for example the shaft elements 55 and 58 in FIG. 2) such that they rotate together. In order to form a magnetic field, the rotor 130L is supplied with electrical power via the field circuit 150, based on the principle of external excitation. The field circuit 150 for this purpose has a field transformer 151 with a primary 151P and a secondary 151S, as well as a rectifier 152 with an anode side 152A and a cathode side 152K. The rectifier 152 is driven via the control unit 153.

The primary of the field transformer 151 is connected via the conductor 154 to the stator $130_S$ of the generator 130, and its secondary is connected via the conductor 155 to the anode $152_A$ of the rectifier 152. The cathode $152_K$ of the rectifier 152 is in turn connected via the conductor 156 to the rotor $130_L$ of the generator 130.

The power emitted from the stator 130S is transformed by the field transformer 151 to a field voltage level, is rectified by means of the rectifier 152, and is then applied to the rotor 130L. The windings of the rotor 130L through with the current flows form a magnetic field which, together with the rotary movement of the rotor 130L, in turn leads to induction and a current flow in the stator 130S.

When the turbine installation is synchronized (for example the CAES installation 1 as shown in FIG. 1a), the electrical power which is generated in this way is supplied as electrical power via the line 134 to a power supply system transformer, and from there it is fed into an external power supply system. In order to interrupt the supply of electrical power that is generated into the external power supply system, an interruption switch 134-U is connected in the line 134, upstream of or else downstream from the power supply system transformer. The power supply system transformer, the external power supply system and further switching elements are not illustrated in FIG. 6.

In the unsynchronized state, the interruption switch 134-U is open, so that no current flows away via the line 134. Therefore in the unsynchronized state, only the field circuit 150 represents a load for the electricity that is generated, although its consumption is only small. The consumption of electrical power within the field circuit 150 is increased while accelerating or decelerating the turbine, or else in other transient operating states of the turbine installation, by connection of one or both of the further electrical loads 160I and 160II that are provided according to the invention to the field circuit 150. This results in the rotor 130L experiencing a greater rotational resistance torque, which is transmitted to the turbine as a braking torque or as braking power.

The further electrical loads, which in this case are in the form of load resistors 160I and 160II, are arranged connected in parallel with the field circuit 150, and can each be connected to the field circuit 150, and can be disconnected from it again, via a switch.

As shown in the illustration in FIG. 6, the electrical loads 160I and 160II can be connected to the field circuit in a region between the secondary 151S of the field transformer 151 and the anode 152A of the rectifier 152. Alternatively or additionally, the electrical loads may, however, also be connectable to other regions of the field circuit 150. This is indicated by the electrical loads 160-X and 160-Y illustrated by dashed lines in FIG. 6.

FIGS. 7a and 7b show generator installations which can be used as the first braking device and/or as the second braking device, or as a part thereof. The generator installation G illustrated in FIG. 7a has a generator, in this case a synchronous or asynchronous generator 230, which is connected for drive purposes to a turbine (for example the turbine 52 in FIG. 2). The generator can be or is expediently connected to the turbine via a shaft such that they rotate together. Furthermore, the generator installation has a transformer 232 whose primary is connected via the connection line 234 to the generator 230, and whose secondary is connected to an external power supply system 235.

A means for frequency matching is arranged such that it can be connected between the generator 230 and the transformer 232. The means for frequency matching is in this case a static frequency converter 240, which is connected in a bypass line 241. The bypass line 241 is tapped off upstream of a first isolating switch 233, which is arranged in the connection line 234, from the connection line 234 and opens back into the connection line 234 again downstream from the first isolating switch 233. In order to allow the current flow through the bypass line 241 to be connected and disconnected again as well as required, a second isolating switch 242 is arranged in the bypass line 241.

While the turbine installation is being started and/or shut down, and possibly during further transient unsynchronized operating states of the connected turbine as well, the first isolating switch 233 which is arranged in the connection line 234 is open. This interrupts the direct connection between the generator 230 and the transformer 232 via the connection line 234. However, the second isolating switch 242 which is arranged in the bypass line 241 is closed, thus providing a connection from the generator 230 to the transformer 232 via the bypass line 241 and the static frequency converter 240. In this switching state, the static frequency converter 240 is operated such that the electrical power generated by the generator 230 is matched to the frequency of the external power supply system 235. The connection of the static frequency converter 240 therefore makes it possible to emit the electrical power generated by the generator 230 while the turbine installation is being started and/or shut down into the external power supply system. Once the turbine installation has been accelerated to a rotation speed which is sufficient for synchronization, the static frequency converter 240 is switched off again. This is done by opening the second isolating switch 242. At the same time, the first isolating switch 233 can be closed, thus making a connection between the generator 230 and the transformer 232 via the connection line 234. When the turbine installation is being shut down, the static frequency converter 240 is switched off on falling below a limit rotation speed, below which there is no interest in emitting the electrical power that is generated into the external power supply system, for control and/or financial reasons.

It has been found that the electrical power which is generated while the turbine installation is being started and/or shut down and is fed into the external electrical power supply system results in a considerable increase in the braking torque produced by the generator 230 and transmitted via the shaft to the turbine. In this case, the increase in the braking torque is largely proportional to the amount of electrical power emitted.

In contrast to the generator installation shown in FIG. 7a, the electrical power generated by the generator 230 in the case of the generator installation G in FIG. 7b is not emitted to an external power supply system (235 in FIG. 7a) but to an internal power supply system 236. For this purpose, the static frequency converter 240 is arranged in a branch line 243 which can be connected. The branch line 243 which can be connected branches off between the generator 230 and the first isolating switch 233 from the connection line 234, and opens into the internal power supply system 236. The internal power supply system 36 is used to supply power to the generator installation G, or else to the entire turbine installation. In order to allow the connection line 234 to be connected to the internal power supply system 236, and to be disconnected from it again, as required, a further, second isolating switch 242 is arranged in the branch line 243. Furthermore, in this case, a transformer 244 is arranged downstream from the static frequency converter 240 in the electrical power flow direction in the branch line 243 and transforms the frequency-converted current to a voltage level that is appropriate for the internal power supply system 236.

The operation of the generator installation G illustrated in FIG. 7b corresponds to the statements relating to FIG. 7a. In addition to the improvements to operation of the installations that have already been mentioned above, the electrical power which is generated while the turbine installation is being started and/or shut down can in this case be fed into the internal power supply even before synchronization of turbine operation. This makes the installation more economically viable overall.

The turbine and the generator installations described in conjunction with FIGS. 2 to 7b represent exemplary embodiments of the invention, which can be modified in many ways without any problems by a person skilled in the art without departing from the essence of the invention in the process.

What is claimed is:

1. A method for optimized starting of an auxiliary group connectable to a main group of a turbine installation, the main group having at least one-first turbine and a generator connected for drive purposes to the first turbine, and the auxiliary group having at least one second turbine, the turbine installation including a first braking device configured to apply braking torque to the auxiliary group when the auxiliary group is decoupled from the main group, the method comprising:

starting the main group and the auxiliary group decoupled from one another;

applying a braking torque to the auxiliary group using the first braking device during the starting of the auxiliary group, the braking torque to the auxiliary group being controllable, wherein the first braking device is at least one of a fluid brake, electrical brake, and mechanical brake; and coupling the auxiliary group to the main group after the main group and the auxiliary group have been started.

2. The method as recited in claim 1, further comprising decoupling the auxiliary group from the main group before the starting of the main group and the auxiliary group.

3. The method as recited in claim 1, wherein the starting includes starting the main group and the auxiliary group at the same time.

4. The method as recited in claim 1, wherein the starting includes starting the main group first and starting the auxiliary group after the starting of the main group.

5. The method as recited in claim 1, further comprising determining fluid and material temperatures of the turbine and controlling the starting of the auxiliary group using a starting control system taking into account the fluid and material temperatures.

6. The method as recited in claim 1, wherein the applying of the braking torque includes operatively connecting the first braking device to the auxiliary group.

7. The method as recited in claim 1, wherein the auxiliary group has a shaft and the applying of the braking torque includes operatively connecting the first braking device to the shaft.

8. The method as recited in claim 1, wherein the applying of the braking torque includes operatively connecting the first braking device to one of the auxiliary group and the main group.

9. The method as recited in claim 1, wherein the applying of the braking torque includes operatively connecting the first braking device to the auxiliary group and the main group at the same time.

10. The method as recited in claim 1, further comprising splitting the braking torque from the first braking device using a device disposed between the first braking device and the auxiliary group and/or between the first braking device and the main group, so as to vary the split in the braking torque from the first braking device.

11. The method as recited in claim 1, wherein the auxiliary group has a shaft and further comprising connecting the first braking device to the shaft such that they rotate together, or with slip.

12. The method as recited in claim 1, wherein the first turbine is a gas turbine and the second turbine is a steam turbine.

13. The method as recited in claim 1, wherein the turbine installation has a second braking device configured to apply a braking torque to the main group when the auxiliary group is decoupled.

14. The method as recited in claim 1, wherein the electrical brake includes at least one of an eddy-current brake and a generator with a static frequency converter.

15. The method as recited in claim 1, wherein the first braking device includes a generator and generator circuitry for connection of the generator, the generator including a stator and a rotor, and the generator circuitry having a field circuit connecting the stator and the rotor, further comprising:

tapping off electrical power from the stator for external excitation of the rotor, and supplying the electrical power to the rotor via the field circuit, and providing at least one further electrical load and connecting the further electrical load to the field circuit so as to increase the braking torque.

16. The method as recited in claim 1, wherein the first braking device includes a generator installation with a generator connected for drive purposes to a turbine in order to generate electricity, and a transformer having a primary connected to the generator and a secondary connected to one of an internal power supply system and an external power supply system, and a device for frequency matching disposed so as to be connectable between the generator and the transformer.

17. The method as recited in claim 13, wherein the second braking device includes a fluid brake.

18. The method as recited in claim 13, wherein the second braking device includes an electrical brake.

19. The method as recited in claim 13, wherein the second braking device includes a mechanical brake.

20. The method as recited in claim 13, wherein the second braking device includes a generator and generator circuitry for connection of the generator, the generator including a stator and a rotor, and the generator circuitry having a field circuit connecting the stator and the rotor, further comprising:

tapping off electrical power from the stator for external excitation of the rotor, and supplying the electrical power to the rotor via the field circuit, and providing at least one further electrical load and connecting the further electrical load to the field circuit so as to increase the braking torque.

21. The method as recited in claim 13, wherein the second braking device includes a generator installation with a generator connected for drive purposes to a turbine in order to generate electricity, and a transformer having a primary connected to the generator and a secondary connected to one of an internal power supply system and an external power supply system, and a device for frequency matching disposed so as to be connectable between the generator and the transformer.

* * * * *